(12) United States Patent  
Calahan et al.

(10) Patent No.: US 7,899,176 B1  
(45) Date of Patent: Mar. 1, 2011

(54) SYSTEMS AND METHODS FOR DISCOVERING CUSTOMER CENTER INFORMATION

(75) Inventors: Marc Calahan, Woodstock, GA (US); Richard Akers, Smyrna, GA (US); Damian Smith, Epsom (GB)

(73) Assignee: Verint Americas Inc., Melville, NY (US)

( * ) Notice: Subject to any disclaimer, the term of this patent is extended or adjusted under 35 U.S.C. 154(b) by 1188 days.

(21) Appl. No.: 11/540,903

(22) Filed: Sep. 29, 2006

(51) Int. Cl.
*H04M 3/00* (2006.01)

(52) U.S. Cl. .................. 379/265.03; 379/265.04; 705/11

(58) Field of Classification Search ............. 379/265.03, 379/265.04, 265.05, 265.06, 266.01; 705/11
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner* — Creighton Smith
(74) *Attorney, Agent, or Firm* — Setter Roche LLP

(57) ABSTRACT

A method for discovering customer center information includes receiving a plurality of customer center information from a plurality of respective information sources, and correlating the plurality of customer center information to determine an identity of a customer center agent accessing customer center resources.

28 Claims, 12 Drawing Sheets

U.S. PATENT DOCUMENTS

| | | | |
|---|---|---|---|
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIlwaine et al. |
| 6,324,282 | B1 | 11/2001 | McIlwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,547 | B1 | 4/2002 | House et al. |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIlwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazer |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,959,078 | B1 | 10/2005 | Eilbacher et al. |
| 6,965,886 | B2 | 11/2005 | Govrin et al. |
| 7,536,437 | B2 * | 5/2009 | Zmolek .................... 709/206 |
| 7,668,849 | B1 * | 2/2010 | Narancic et al. .................... 1/1 |
| 7,680,263 | B2 * | 3/2010 | Nice et al. ................ 379/265.04 |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2005/0138560 | A1 | 6/2005 | Lee et al. |
| 2006/0023865 | A1 * | 2/2006 | Nice et al. ................ 379/265.04 |
| 2007/0011008 | A1 * | 1/2007 | Scarano et al. ................ 704/254 |
| 2007/0198322 | A1 * | 8/2007 | Bourne et al. .................. 705/10 |
| 2007/0198325 | A1 * | 8/2007 | Lyerly et al. .................... 705/10 |
| 2007/0198329 | A1 * | 8/2007 | Lyerly et al. .................... 705/11 |
| 2007/0287430 | A1 * | 12/2007 | Hosain et al. ............. 455/414.1 |
| 2008/0270210 | A1 * | 10/2008 | Kratschmer et al. .............. 705/7 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of AI in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *Info World* 20(47):6467 (Nov. 23, 1998).
Unknown Author, "Long-distance learning," *Info World* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Rohde. *Gates Touts Interactive TV*, InfoWorld, Oct. 14, 1999.
Ross. *Broadcasters Use TV Signals to Send Data*, PC World Oct. 1996.
Stewart. *Interactive Television at Home: Television Meets the Internet*, Aug. 1998.
Wilson, *U.S. West Revisits Interactive TV*, Interactive Week, Nov. 28, 1999.

* cited by examiner

SYSTEMS AND METHODS FOR DISCOVERING CUSTOMER CENTER INFORMATION

FIELD OF THE DISCLOSURE

The present disclosure generally relates to the discovery of customer center information.

DESCRIPTION OF THE RELATED ART

Customer centers are staffed by agents who handle incoming and/or outgoing contacts. Although the traditional and most common form of contact is by phone, other types of contacts are becoming more common (e.g., text chat, web collaboration, email, and fax). A customer center may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

In order to facilitate customer center contacts, a customer center typically includes an agent phone and a workstation computer. A network connects one or more of the agent computers. During a customer contact, the agent interacts with one or more applications running on the workstation. Workstation applications give the agent access to customer records, product information, ordering status, and transaction history, for example.

Customer centers typically record telephone contacts of an agent, along with data indicating what information was accessed or entered by the agent via an agent workstation. Unfortunately, different agents may use different telephones and/or agent computers over a period of time making difficult to track the telephone and workstation contacts corresponding to an agent, especially when an agent uses a laptop in combination with various customer center telephones.

SUMMARY

Customer center information discovery systems and methods are disclosed. An embodiment of a method for discovering customer center information includes receiving a plurality of customer center information from a plurality of respective information sources, and correlating the plurality of customer center information to determine an identity of a customer center agent accessing customer center resources.

An embodiment of a system for discovering customer center information includes: memory; software stored in the memory; processor; and at least one communication interface configured to receive a plurality of customer center information from a plurality of respective information sources; wherein the processor is instructed by the software to correlate the plurality of customer center information to determine an identity of a customer center agent accessing customer center resources.

Another embodiment of a method for discovering customer center information includes: receiving telephone identification information from a first information source; receiving computer identification information from a second information source; receiving information identifying a customer center agent from a third information source; correlating at least one of the telephone identification information and the computer identification information with the information identifying the customer center agent; and determining that at least one of the telephone identification information and the computer identification information corresponds to the customer center agent.

Other objects, features, and advantages of the embodiments will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate similar components throughout the several views.

DETAILED DESCRIPTION

Systems and methods are provided that discover workspace information corresponding to respective customer center agents. The workspace information is gathered from different sources, such as, for example, a customer center agent computer, a customer center agent telephone, a telephone control device (e.g., a telephone switch, an automatic call distributor (ACD), or a call manager/control device), a CTI (computer telephony integration) server, a human resources computer, a server hosting a customer relations management (CRM) application and/or a network server. The information that is gathered may identify, for example, a customer center agent, a customer center computer and/or a customer center telephone. The gathered information is analyzed to determine which customer center computer and/or telephone is being used by a particular customer center agent. In other words, gathered information is used to map a customer center workspace. This enables a customer center to track and record contacts and activities corresponding to respective customer center agents, regardless of the customer center resources that the agent is using.

Figure 1:
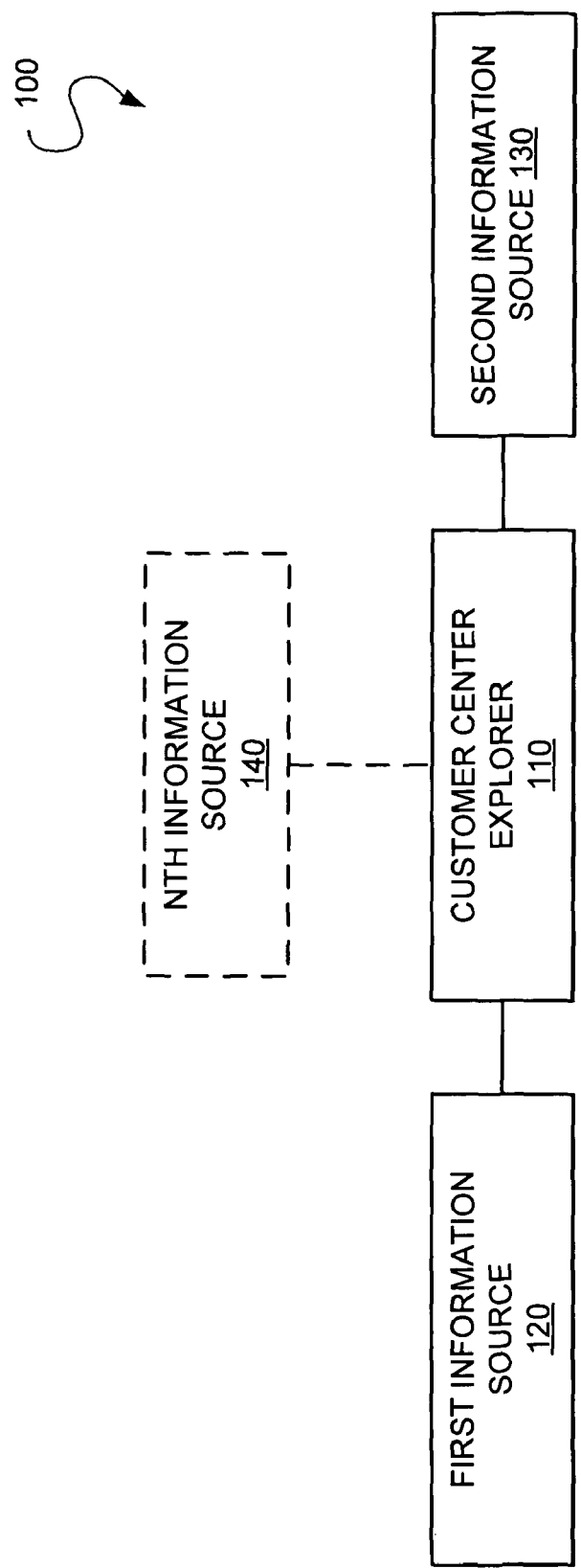
FIG. 1 is a simplified block diagram depicting an embodiment of a customer center information discovery system.

FIG. 1 is a simplified block diagram depicting an embodiment of a customer center information discovery system 100. The system 100 includes a customer center explorer 110 that is coupled to external information sources 120, 130 and/or 140. The external information sources 120, 130 and/or 140 contain respective customer center information. The external information sources 120, 130 and/or 140 may each be, for example, a customer center agent computer, a customer center agent telephone, a telephone control device (e.g., a telephone switch, an automatic call distributor (ACD), or a call manager/control device), a CTI server, a CRM server, a human resources computer, or a network server. A CTI server enables customer center agent computers to control telephony functions such as, for example, making and receiving contacts (voice, facsimile and/or data), telephone directory services and/or caller identification.

The external information sources 120, 130 and/or 140 provide customer center information to the customer center explorer 110. The customer center information provided may identify, for example, a customer center agent, a customer center computer and/or a customer center telephone. The customer center information may be requested by the customer center explorer 110 from the external information sources 120, 130 and/or 140 and/or may be provided to the customer center explorer 110 without the need for a specific request by the customer center explorer 110 for the customer center information. For example, customer center information may be provided by the external information sources 120, 130 and/or 140 to the customer center explorer 110 at predetermined intervals and/or responsive to a change made to the customer center information stored in the external information sources 120, 130 and/or 140.

The customer center explorer 110 may use customer center information received from the external information sources 120, 130 and/or 140 to create, and/or update a customer center information data structure (e.g., database). The customer center explorer 110 may alternatively simply associate information received from various external information sources. The customer center explorer 110 may receive some or all of the following information from respective external information sources, as will be explained in further detail below: telephone extensions on a telephone control device, extension-to-telephone mappings (e.g., a single telephone may have more than one extension or multiple lines for an extension), customer center agent identifications (agent IDs) configured on the telephone control device, agentID-to-agent name mappings, identity of agent computers (e.g., workstations) coupled to a customer center network, identity of domains (groups of networked computers that share common communications addresses), network login information, ACD login information, extension numbers, hunt groups, skill groups, and information about agents (e.g., names, positions in the company, dates of birth, social security numbers, e-mail addresses, pay rates, names of supervisors and/or home addresses).

By matching the names provided by one external information source to the names provided by another external information source, the customer center explorer 110 can determine which telephone (or telephone extension(s)) and/or computer (or terminal server session) corresponds to each customer center agent. This then enables a customer center to map customer center workspaces and to track and record contacts and activities corresponding to respective customer center agents.

Customer center workspaces may be mapped dynamically as the workspaces change. For example, a customer center explorer 110 receives information from a first information source indicating that an agent named "john doe" has the agentID 1234. The contact center explorer 110 then receives information from a second information source indicating that an agent having the agentID 1234 has logged into a telephone having the ID 3000. The customer center explorer 110 can then associate the name john doe, the agentID 1234, and the telephone ID 3000, which are collectively considered a workspace.

Continuing with this example, the contact center explorer 110 also receives information from a third information source indicating that john doe has the network login ID jdoe. When a fourth information source provides the contact center explorer 110 with information indicating that someone has logged into the workstation jdoe2 having the network login ID jdoe, the mapped workspace can be expanded by associating the name john doe, the agentID 1234, the telephone ID 3000, the network login ID jdoe, and the workstation jdoe2.

When the contact center explorer later receives information indicating a logout event involving the mapped workspace, then the workspace association can be modified accordingly. For example, when the fourth information source provides the contact center explorer 110 with information indicating that someone having the network login ID jdoe has logged off from the workstation jdoe2, then the mapped workspace can be reduced by excluding the workstation jdoe2 from the association. The revised mapped workspace would then only include the name john doe, the agentID 1234, the telephone ID 3000, and the network login ID jdoe, for example.

Figure 2:
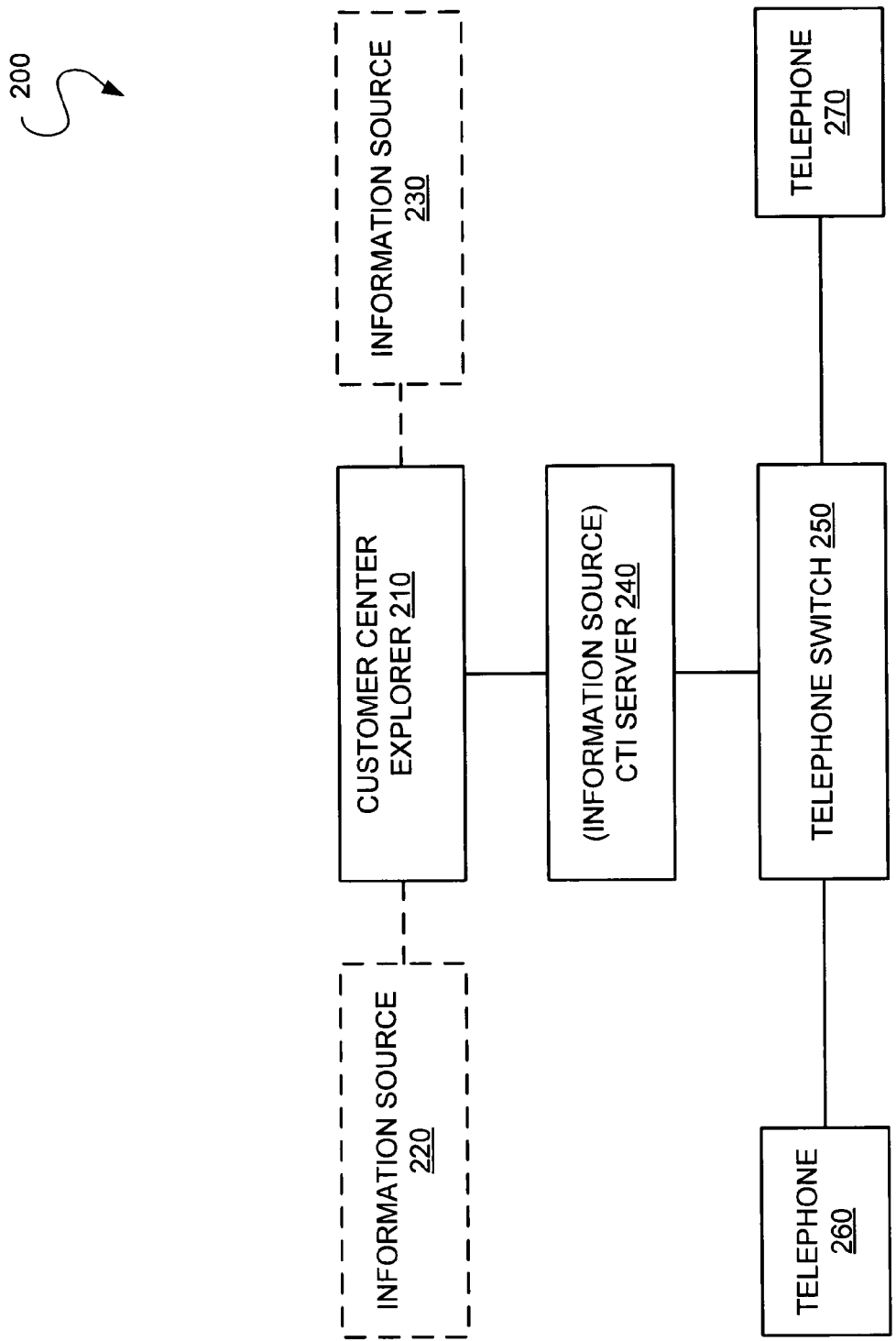
FIG. 2 is a simplified block diagram depicting another embodiment of a customer center information discovery system, wherein one of the external information sources is a computer telephone integration (CTI) server that is coupled to a telephone control device.

FIG. 2 is a simplified block diagram depicting another embodiment of a customer center information discovery system. A customer center explorer 210 is coupled to external information sources 220, 230 and/or 240. The external information sources 220, 230 and/or 240 contain respective customer center information. The external information sources 220, 230 and/or 240 may each be, for example, a customer center agent computer, a customer center agent telephone, a telephone control device, a CTI server, a human resources computer, or a network server. In this embodiment, the external information source 240 is a CTI server.

The external information sources 220, 230 and/or 240 provide customer center information to the customer center explorer 210. The customer center information provided may identify, for example, a customer center agent, a customer center computer and/or a customer center telephone. The customer center information may be requested by the customer center explorer 210 from the external information sources 220, 230 and/or 240 and/or may be provided to the customer center explorer 210 without the need for a specific request by the customer center explorer 210 for the customer center information. For example, customer center information may be provided by the external information sources 220, 230 and/or 240 to the customer center explorer 210 at predetermined intervals and/or responsive to a change made to the customer center information stored in the external information sources 220, 230 and/or 240.

The customer center explorer 210 may use customer center information received from the external information sources 220, 230 and/or 240 to create, and/or update a customer center information data structure (e.g., database). The customer center 210 may alternatively simply associate information received from various external information sources.

The external information source 240 is coupled to a telephone control device 250, which is in turn coupled to telephones 260 and 270. The external information source 240 is configured to provide the customer center explorer 210 with information corresponding to the telephones 260 and 270. The information provided by the external information source 240 may identify, for example, one or more of the following:
1) telephone extensions on a telephone control device;
2) extension-to-telephone mappings;
3) customer center agent identifications (agentIDs) configured on a telephone control device; and
4) agentID-to-agent name mappings.
5) extension-to-agentID mappings.

By matching the names provided by the external information source 240 to the names provided by another external information source (e.g., a human resources computer or a CRM application), the customer center explorer 210 can determine which customer center agent is using a particular telephone (or telephone extensions). This then enables a customer center to track and record telephone contacts corresponding to respective customer center agents.

Figure 3:
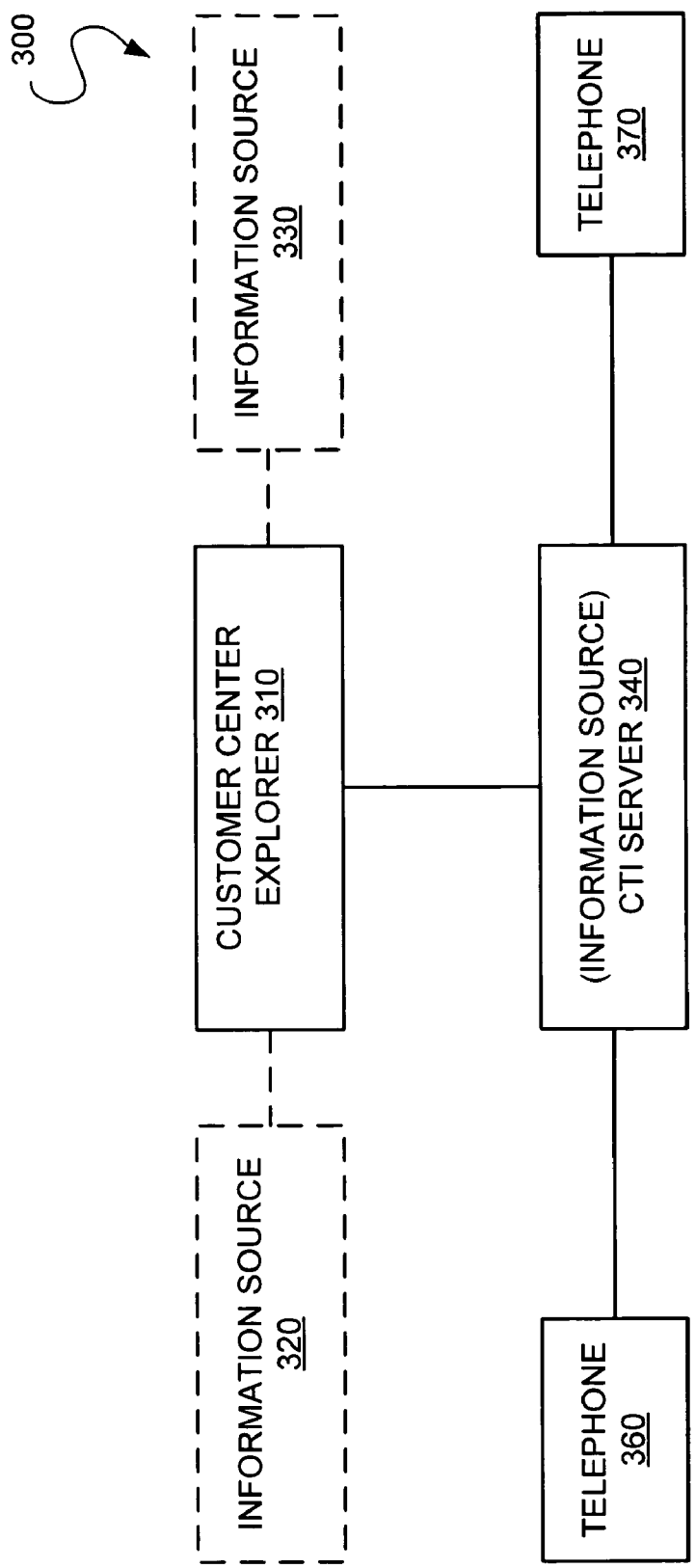
FIG. 3 is a simplified block diagram depicting another embodiment of a customer center information discovery system, wherein one of the external information sources is a CTI server that is coupled to telephones.

FIG. 3 is a simplified block diagram depicting another embodiment of a customer center information discovery system. A customer center explorer 310 is coupled to external information sources 320, 330 and/or 340. The external information sources 320, 330 and/or 340 contain respective customer center information. The external information sources 320, 330 and/or 340 may each be, for example, a customer center agent computer, a customer center agent telephone, a telephone control device, a CTI server, a human resources computer, or a network server. In this embodiment, the external information source 340 is a CTI server.

The external information sources 320, 330 and/or 340 provide customer center information to the customer center explorer 310. The customer center information provided may identify, for example, a customer center agent, a customer center computer and/or a customer center telephone. The customer center information may be requested by the customer center explorer 310 from the external information sources 320, 330 and/or 340 and/or may be provided to the customer center explorer 310 without the need for a specific request by the customer center explorer 310 for the customer center information. For example, customer center information may be provided by the external information sources 320, 330 and/or 340 to the customer center explorer 310 at predetermined intervals and/or responsive to a change made to the customer center information stored in the external information sources 320, 330 and/or 340.

The customer center explorer 310 may use customer center information received from the external information sources 320, 330 and/or 340 to create, and/or update a customer center information data structure (e.g., database). The customer center explorer 310 may alternatively simply associate information received from various external information sources.

The external information source 340 is coupled to telephones 360 and 370. The external information source 340 is configured to provide the customer center explorer 310 with information corresponding to the telephones 360 and 370. The information provided by the external information source 340 may identify, for example, one or more of the following:
1) telephone extensions on a telephone control device;
2) extension-to-telephone mappings;
3) customer center agent identifications (agentIDs) configured on a telephone control device; and
4) agentID-to-agent name mappings.
5) extension-to-agentID mappings.

By matching the names provided by the external information source 340 to the names provided by another external information source (e.g., a human resources computer or a CRM application), the customer center explorer 310 can determine which customer center agent is using a particular telephone (or telephone extensions). This then enables a customer center to track and record telephone contacts corresponding to respective customer center agents.

Figure 4:
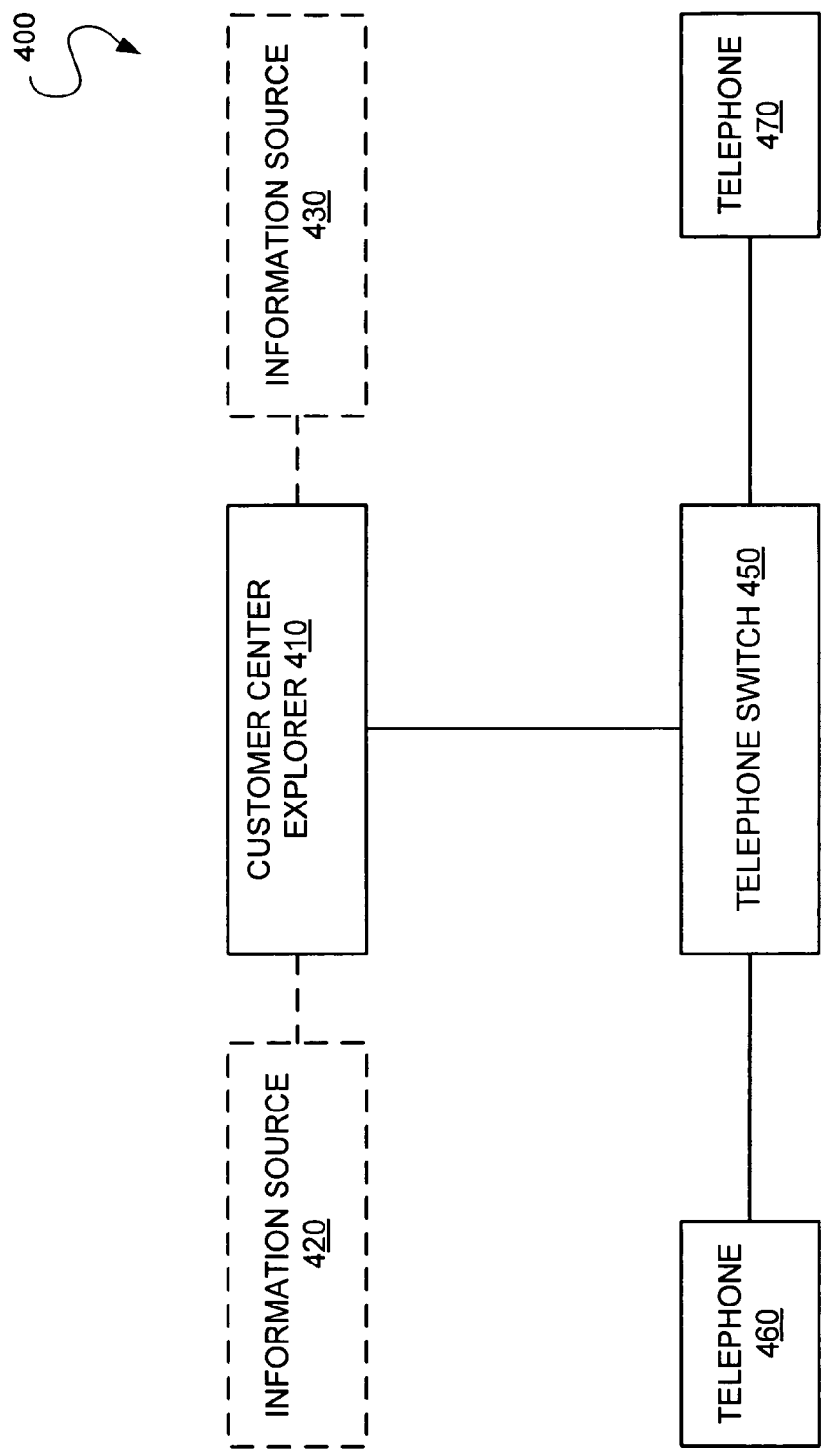
FIG. 4 is a simplified block diagram depicting another embodiment of a customer center information discovery system, wherein one of the external information sources is a telephone control device.

FIG. 4 is a simplified block diagram depicting another embodiment of a customer center information discovery system. A customer center explorer 410 is coupled to external information sources 420, 430 and/or 450. The external information sources 420, 430 and/or 450 contain respective customer center information. The external information sources 420, 430 and/or 450 may each be, for example, a customer center agent computer, a customer center agent telephone, a telephone control device, a CTI server, a human resources computer, or a network server. In this embodiment, the external information source 450 is a telephone control device.

The external information sources 420, 430 and/or 450 provide customer center information to the customer center explorer 410. The customer center information provided may identify, for example, a customer center agent, a customer center computer and/or a customer center telephone. The customer center information may be requested by the customer center explorer 410 from the external information sources 420, 430 and/or 450 and/or may be provided to the customer center explorer 410 without the need for a specific request by the customer center explorer 410 for the customer center information. For example, customer center information may be provided by the external information sources 420, 430 and/or 450 to the customer center explorer 410 at predetermined intervals and/or responsive to a change made to the customer center information stored in the external information sources 420, 430 and/or 450.

The customer center explorer 410 may use customer center information received from the external information sources 420, 430 and/or 450 to create, and/or update a customer center information data structure (e.g., database). The customer center explorer 410 may alternatively simply associate information received from various external information sources.

The external information source 450 is coupled to telephones 460 and 470. The external information source 450 is configured to provide the customer center explorer 410 with information corresponding to the telephones 460 and 470. The information provided by the external information source 450 may identify, for example, one or more of the following:
1) telephone extensions on a telephone control device;
2) extension-to-telephone mappings;
3) customer center agent identifications (agentIDs) configured on a telephone control device; and
4) agentID-to-agent name mappings.
5) extension-to-agentID mappings.

By matching the names provided by the external information source 450 to the names provided by another external information source (e.g., a human resources computer or a CRM application), the customer center explorer 410 can determine which customer center agent is using a particular telephone (or telephone extensions). This then enables a customer center to track and record telephone contacts corresponding to respective customer center agents.

Figure 5:
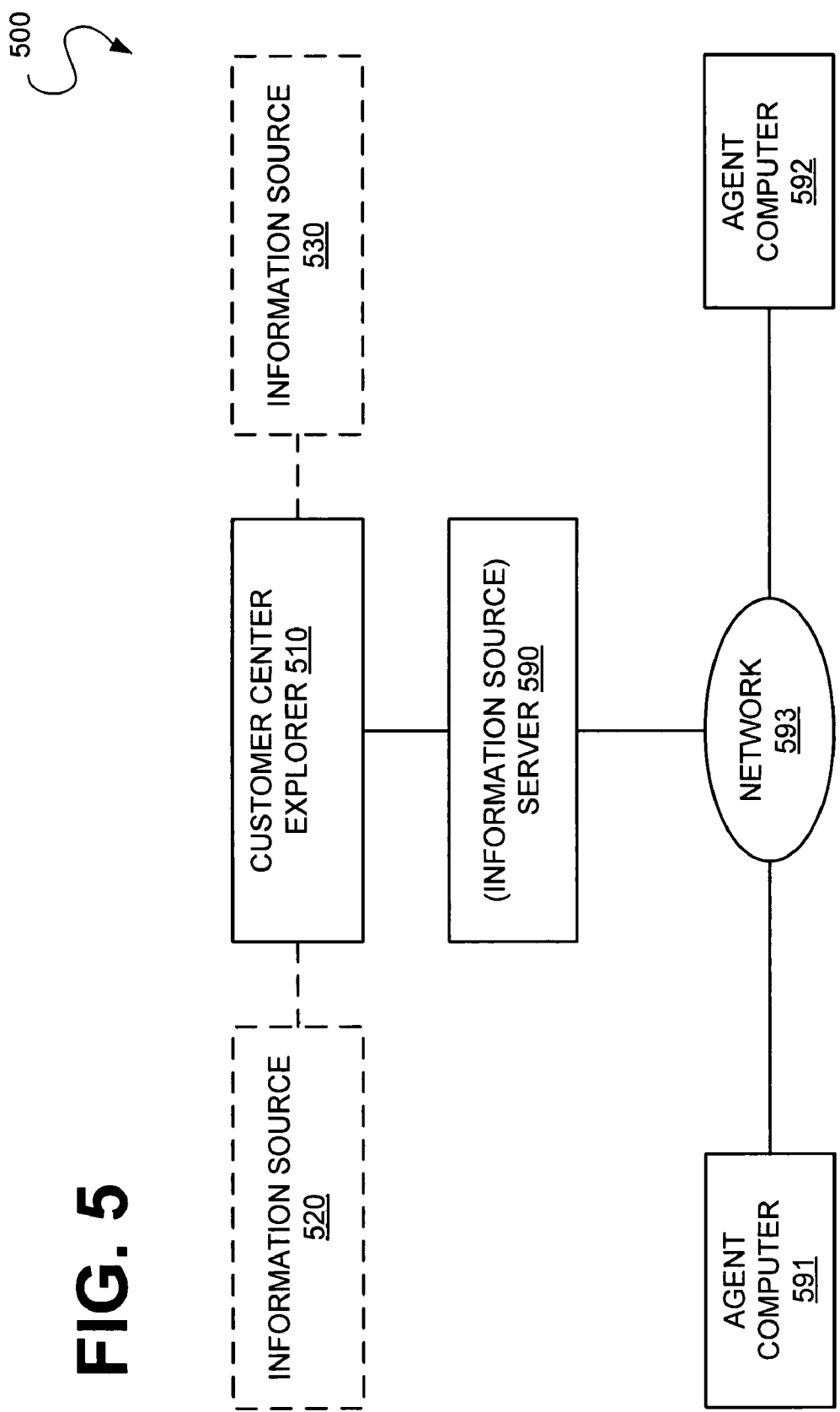
FIG. 5 is a simplified block diagram depicting another embodiment of a customer center information discovery system, wherein one of the external information sources is a network server.

FIG. 5 is a simplified block diagram depicting another embodiment of a customer center information discovery system. A customer center explorer 510 is coupled to external information sources 520, 530 and/or 590. The external information sources 520, 530 and/or 590 contain respective customer center information. The external information sources 520, 530 and/or 590 may each be, for example, a customer center agent computer, a customer center agent telephone, a telephone control device, a CTI server, a human resources computer, or a network server. In this embodiment, the external information source 590 is a server (e.g., a network server or CRM application server).

The external information sources 520, 530 and/or 590 provide customer center information to the customer center explorer 510. The customer center information provided may identify, for example, a customer center agent, a customer center computer and/or a customer center telephone. The customer center information may be requested by the customer center explorer 510 from the external information sources 520, 530 and/or 590 and/or may be provided to the customer center explorer 510 without the need for a specific request by the customer center explorer 510 for the customer center information. For example, customer center information may be provided by the external information sources 520, 530 and/or 590 to the customer center explorer 510 at predetermined intervals and/or responsive to a change made to the customer center information stored in the external information sources 520, 530 and/or 590.

The customer center explorer 510 may use customer center information received from the external information sources 520, 530 and/or 590 to create, and/or update a customer center information data structure (e.g., database). The customer center explorer 510 may alternatively simply associate information received from various external information sources.

The external information source 590 is coupled to agent computers 591 and 592 via a network 593. The network 593 may be a wired or wireless network. In one embodiment, the network 593 is an Ethernet network. The external information source 590 is configured to provide the customer center explorer 510 with information corresponding to agent computers 591 and 592. The information provided by the external information source 590 may identify, for example, one or more of the following:
1) agent computers coupled to the network 593;
2) domains;
3) network login information;
4) agentID-to-person mappings.
5) agent-to-terminal server session mappings.

By matching the names provided by the external information source 590 to the names provided by another external information source (e.g., a human resources computer, or a CRM application), the customer center explorer 510 can determine which customer center agent is using a particular computer (or terminal server session). This then enables a customer center to track and record computer contacts and activities corresponding to respective customer center agents.

Figure 6:
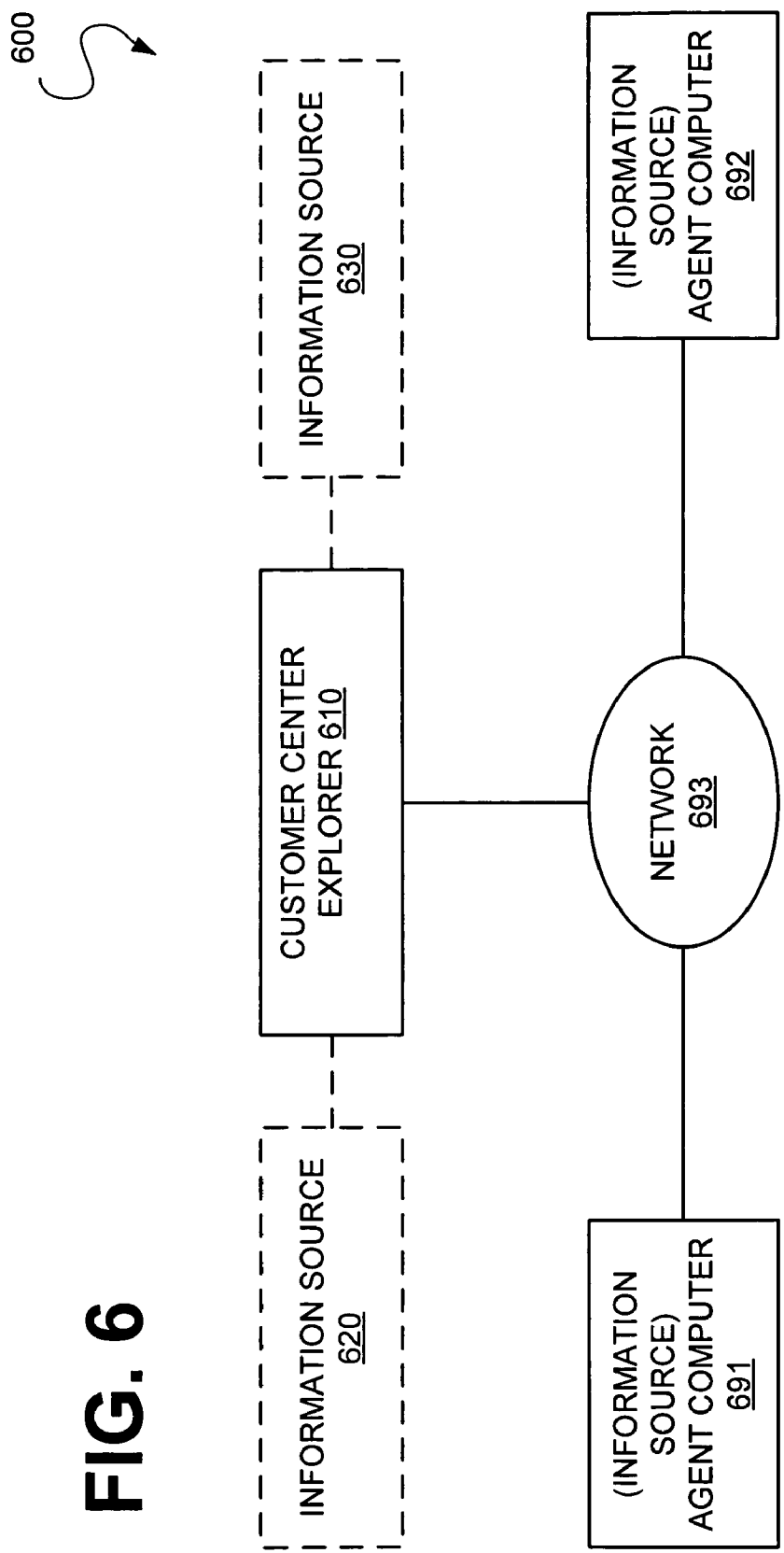
FIG. 6 is a simplified block diagram depicting another embodiment of a customer center information discovery system, wherein one of the external information sources is an agent computer.

FIG. 6 is a simplified block diagram depicting another embodiment of a customer center information discovery system. A customer center explorer 610 is coupled to external information sources 620, 630, 691 and/or 692. The external information sources 620, 630, 691 and/or 692 contain respective customer center information. The external information sources 620, 630, 691 and/or 692 may each be, for example, a customer center agent computer, a customer center agent telephone, a telephone control device, a CTI server, a human resources computer, or a network server. In this embodiment, the external information sources 691 and 691 are customer center agent computers.

The external information sources 620, 630, 691 and/or 692 provide customer center information to the customer center explorer 610. The customer center information provided may identify, for example, a customer center agent, a customer center computer and/or a customer center telephone. The customer center information may be requested by the customer center explorer 610 from the external information sources 620, 630, 691 and/or 692 and/or may be provided to the customer center explorer 610 without the need for a specific request by the customer center explorer 610 for the customer center information. For example, customer center information may be provided by the external information sources 620, 630, 691 and/or 692 to the customer center explorer 610 at predetermined intervals and/or responsive to a change made to the customer center information stored in the external information sources 620, 630, 691 and/or 692.

The customer center explorer 610 may use customer center information received from the external information sources 620, 630, 691 and/or 692 to create, and/or update a customer center information data structure (e.g., database). The customer center explorer 610 may alternatively simply associate information received from various external information sources.

The customer center explorer 610 is coupled to the external information sources 691 and 692 via a network 693. The network 693 may be a wired or wireless network. In one embodiment, the network 693 is an Ethernet network. The external information sources 691 and 692 are configured to provide the customer center explorer 610 with information identifying, for example, one or more of the following:
1) agent computers coupled to the network 693;
2) domains;
3) network login information;
4) agentID-to-person mappings.
5) agent-to-terminal server session mappings.

By matching the names provided by the external information sources 691 and 692 to the names provided by another external information source (e.g., a human resources computer, or a CRM application), the customer center explorer 610 can determine which customer center agent is using a particular computer (or terminal server session). This then enables a customer center to track and record computer contacts and activities corresponding to respective customer center agents.

Figure 7:
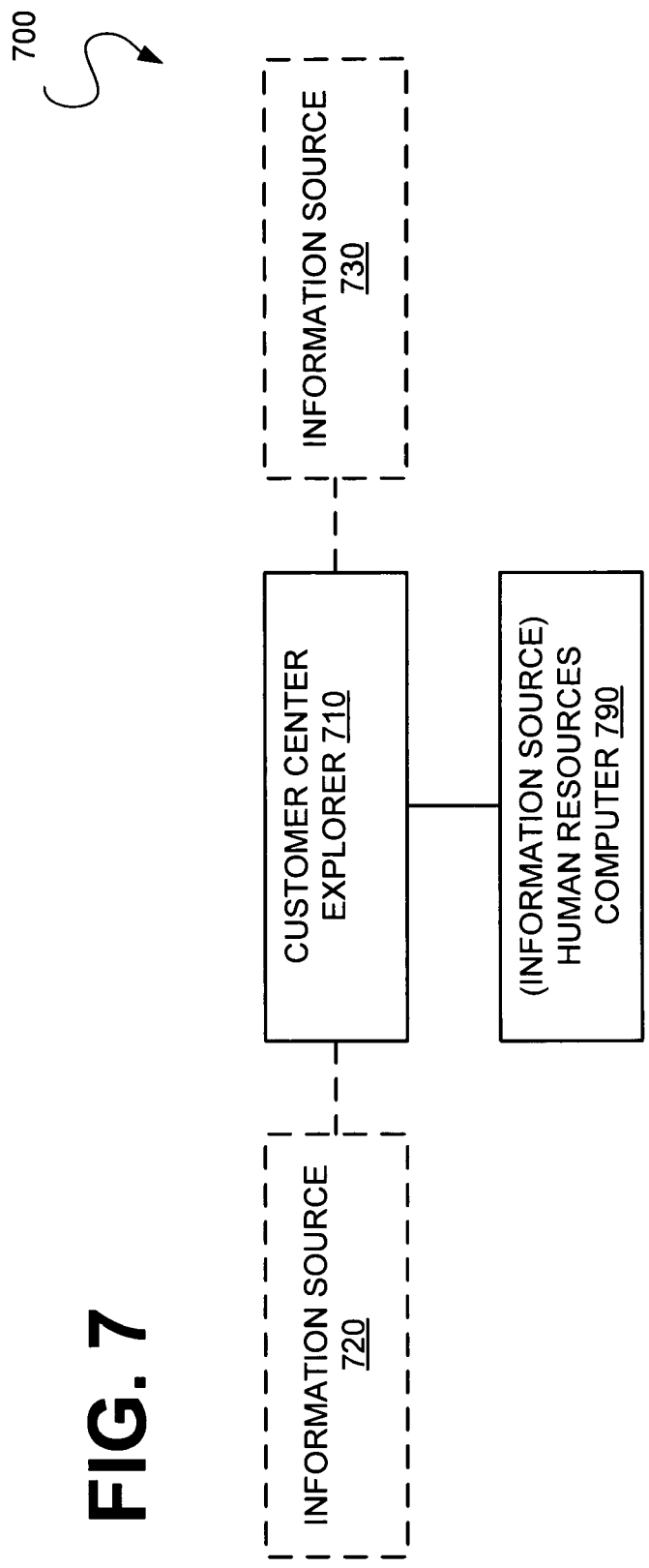
FIG. 7 is a simplified block diagram depicting another embodiment of a customer center information discovery system, wherein one of the external information sources is a human resources computer.

FIG. 7 is a simplified block diagram depicting another embodiment of a customer center information discovery system. A customer center explorer 710 is coupled to external information sources 720, 730 and/or 790. The external information sources 720, 730 and/or 790 contain respective customer center information. The external information sources 720, 730 and/or 790 may each be, for example, a customer center agent computer, a customer center agent telephone, a telephone control device, a CTI server, a human resources computer, or a network server.

The external information sources 720, 730 and/or 790 provide customer center information to the customer center explorer 710. The customer center information provided may identify, for example, a customer center agent, a customer center computer and/or a customer center telephone. The customer center information may be requested by the customer center explorer 710 from the external information sources 720, 730 and/or 790 and/or may be provided to the customer center explorer 710 without the need for a specific request by the customer center explorer 710 for the customer center information. For example, customer center information may be provided by the external information sources 720, 730 and/or 790 to the customer center explorer 710 at predetermined intervals and/or responsive to a change made to the customer center information stored in the external information sources 720, 730 and/or 790.

In this embodiment, the external information source 790 is a human resources computer configured to provide customer center information corresponding to customer center agents. The customer center information provided by external information source 790 may include for example, the following agent information: name, position in the company, date of birth, social security number, e-mail address, pay rate, name of supervisor and/or home address.

The customer center explorer 710 may use customer center information received from the external information sources 720, 730 and/or 790 to create, and/or update a customer center information data structure (e.g., database). The customer center explorer 710 may alternatively simply associate information received from various external information sources.

By matching the names provided by the external information source 790 to the names provided by another external information source (e.g., a telephone control device, a CTI server, a network server and/or an agent computer), the customer center explorer 710 can determine which customer center agent is using a particular telephone (or telephone extensions) and/or computer (or terminal server session). This then enables a customer center to track and record telephone and/or computer contacts corresponding to respective customer center agents.

Figure 8:
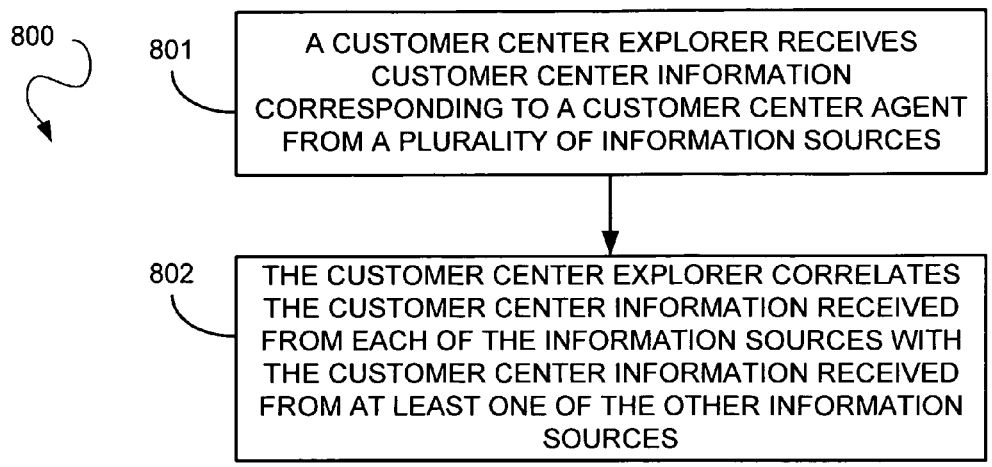
FIGS. 8-13 are flow charts depicting respective embodiments of methods for discovering customer center information.

FIG. 8 is a flow chart depicting an embodiment of a customer center discovery method 800. According to step 801, a customer center explorer receives customer center information from a plurality of respective external information sources. The customer center information may include, for example, one or more of the following: telephone extensions on a telephone control device, extension-to-telephone mappings, customer center agent identifications (agent IDs) configured on the telephone control device, agentID-to-agent name mappings, identity of agent computers coupled to a customer center network, identity of domains, network login information, and information about agents (e.g., names, positions in the company, dates of birth, social security numbers, e-mail addresses, pay rates, names of supervisors and/or home addresses).

According to step 802, the customer center explorer correlates the customer center information received from each of the external information sources with the customer center information received from at least one of the other external information sources. This may be done by matching the names of agents provided by one external information source to the names of agents provided by another external information source. The name matching enables the customer center explorer to identify a telephone (or telephone extension(s)) and/or computer (or terminal server session) that a particular agent is using.

As an example, if an agent is using his laptop computer in conjunction with a particular telephone, then login information corresponding to the laptop and telephone can be used to identify the agent (e.g., by matching the names associated with the login information to a name received from a human resource computer). This then enables the customer center to record telephone and laptop activity corresponding to the agent.

Figure 9:
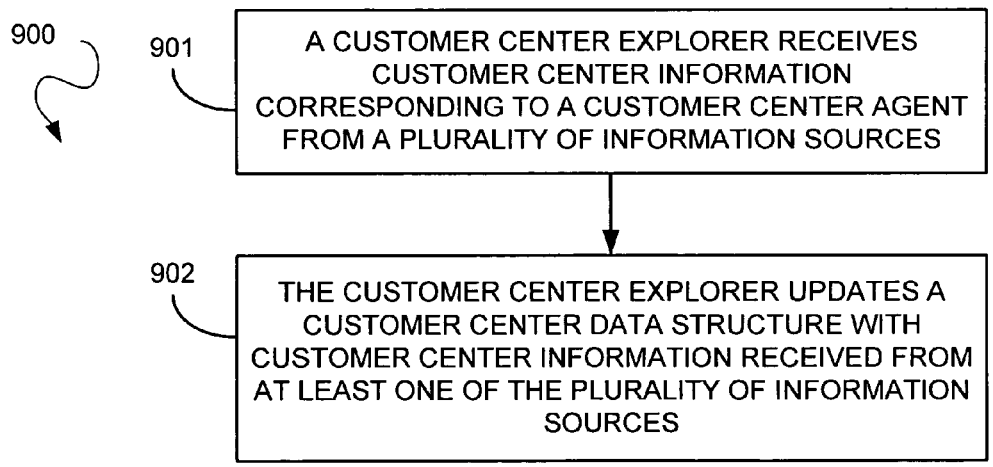

FIG. 9 is a flow chart depicting an embodiment of a customer center discovery method 900. According to step 901, a customer center explorer receives customer center information from a plurality of respective external information sources. The customer center information may include, for example, one or more of the following: telephone extensions on a telephone control device, extension-to-telephone mappings, customer center agent identifications (agent IDs) configured on the telephone control device, agentID-to-agent name mappings, identity of agent computers coupled to a customer center network, identity of domains, network login information, and information about agents (e.g., names, positions in the company, dates of birth, social security numbers, e-mail addresses, pay rates, names of supervisors and/or home addresses). Then, according to step 902, the customer center explorer creates and/or updates a customer center data structure (e.g., database) with customer center information received from at least one of the plurality of external information sources.

Figure 10:
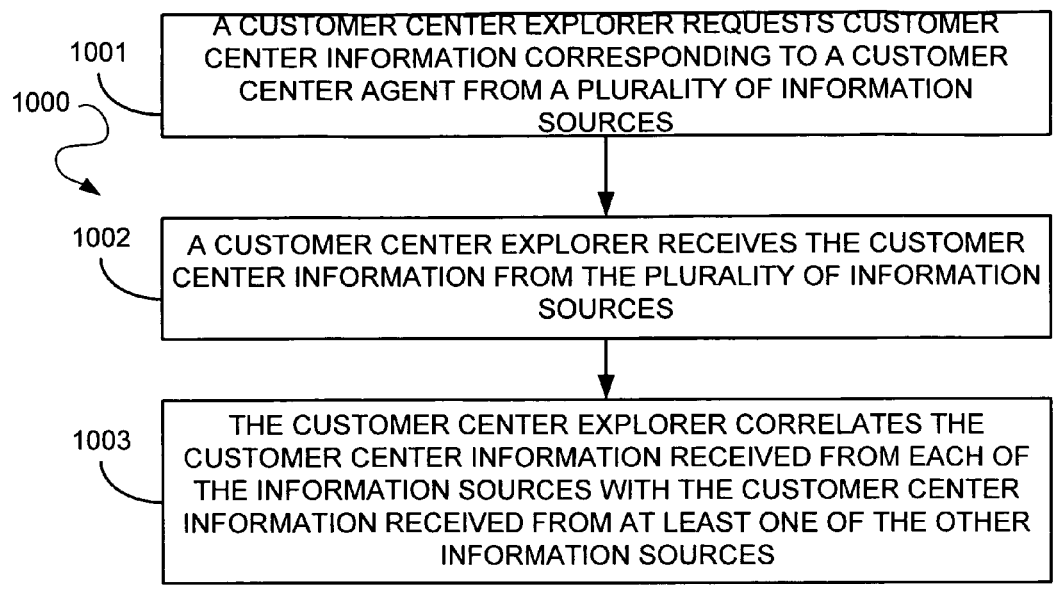

FIG. 10 is a flow chart depicting an embodiment of a customer center discovery method 1000. According to step 1001, a customer center explorer requests a plurality of customer center information from a plurality of respective external information sources. According to step 1002, the customer center explorer receives the customer center information from the plurality of external information sources. The customer center information may include, for example, one or more of the following: telephone extensions on a telephone control device, extension-to-telephone mappings, customer center agent identifications (agent IDs) configured on the telephone control device, agentID-to-agent name mappings, identity of agent computers coupled to a customer center network, identity of domains, network login information, and information about agents (e.g., names, positions in the company, dates of birth, social security numbers, e-mail addresses, pay rates, names of supervisors and/or home addresses).

According to step 1003, the customer center explorer correlates the customer center information received from each of the external information sources with the customer center information received from at least one of the other external information sources. This may be done by matching the names of agents provided by one external information source to the names of agents provided by another external information source. The name matching enables the customer center explorer to identify a telephone (or telephone extension(s)) and/or computer (or terminal server session) that a particular agent is using.

Figure 11:
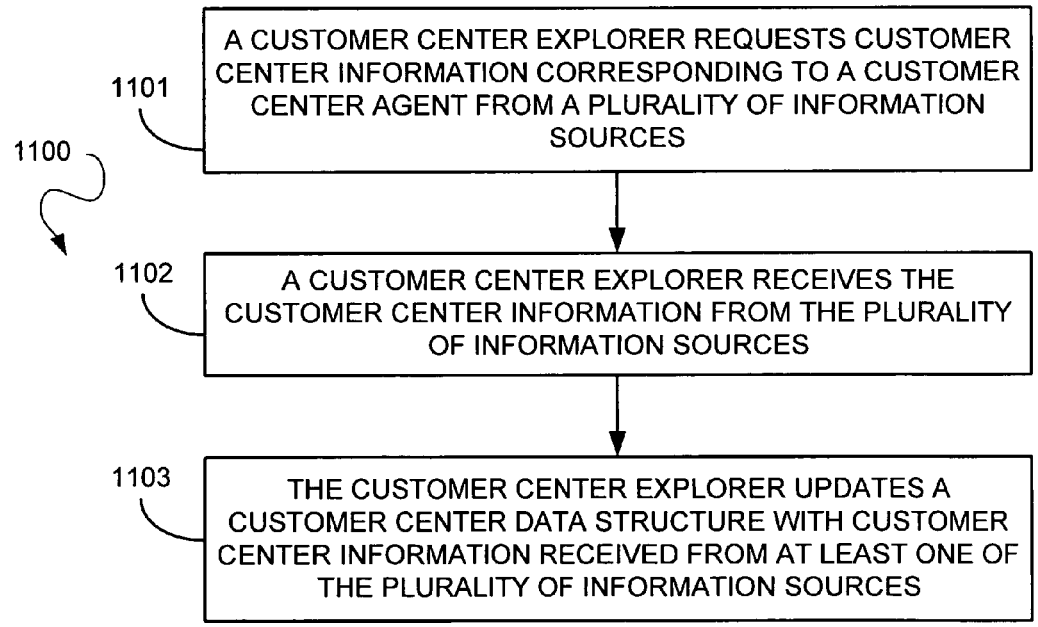

FIG. 11 is a flow chart depicting an embodiment of a customer center discovery method 1100. According to step 1101, a customer center explorer requests a plurality of customer center information from a plurality of respective external information sources. The customer center information may include, for example, one or more of the following: telephone extensions on a telephone control device, extension-to-telephone mappings, customer center agent identifications (agent Ds) configured on the telephone control device, agentID-to-agent name mappings, identity of agent computers coupled to a customer center network, identity of domains, network login information, and information about agents (e.g., names, positions in the company, dates of birth, social security numbers, e-mail addresses, pay rates, names of supervisors and/or home addresses).

According to step 1102, the customer center explorer receives the customer center information from the plurality of external information sources. According to step 1103, the customer center explorer creates and/or updates a customer center data structure (e.g., database) with customer center information received from at least one of the plurality of external information sources. The data structure enables the customer center to identify a telephone (or telephone extension(s)) and/or computer (or terminal server session) that a particular agent is using.

Figure 12:
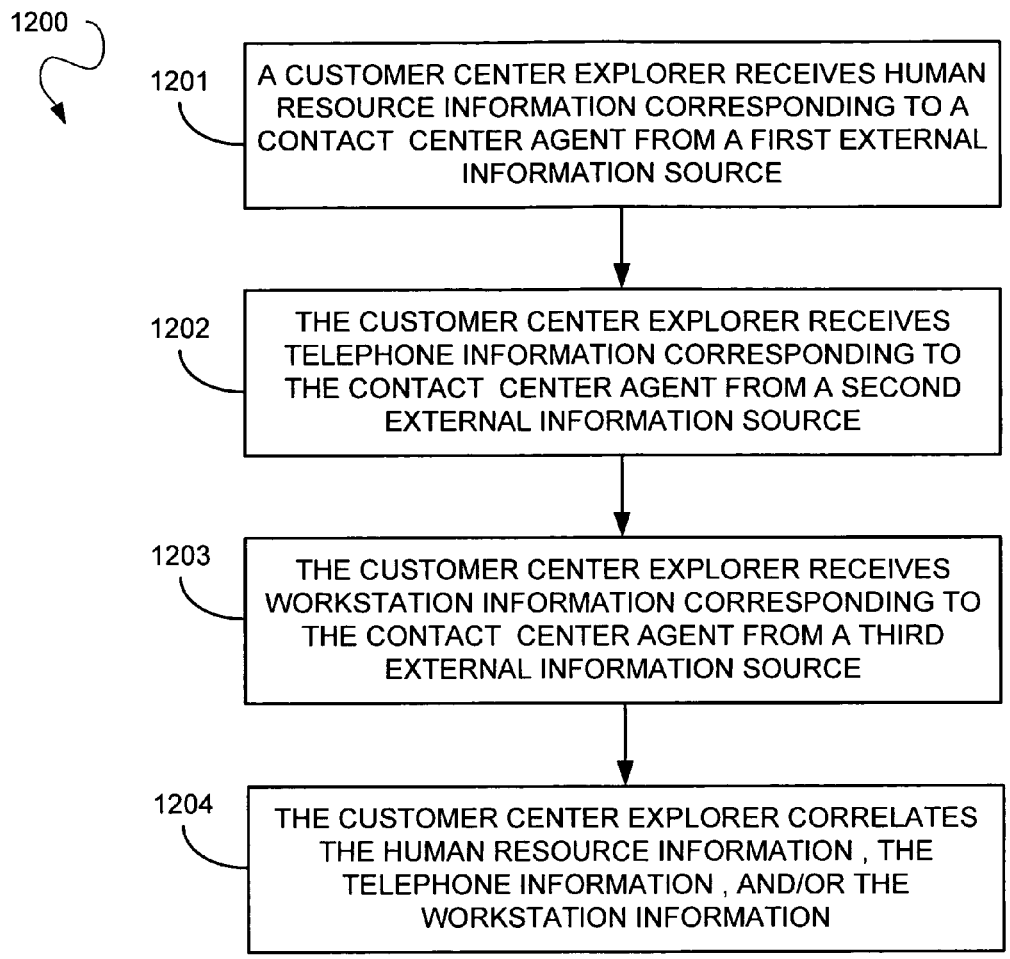

FIG. 12 is a flow chart depicting an embodiment of a customer center discovery method 1200. According to step 1201, a customer center explorer receives human resource information corresponding to customer center agents from a first external information source. The human resource information may include, for example, one or more of the following information corresponding to an agent: name, position in the company, date of birth, social security number, e-mail address, pay rate, name of supervisor and/or home address.

According to step 1202, the customer center explorer receives telephone information corresponding to the customer center agents from a second external information source. The telephone information may include, for example, one or more of the following: telephone extensions on a telephone control device, extension-to-telephone mappings, customer center agent identifications (agent IDs) configured on the telephone control device, and agentID-to-agent name mappings.

According to step 1203, the customer center explorer receives computer information corresponding to customer center agents from a third external information source. The computer information may include, for example, one or more of the following: agentID-to-agent name mappings, identity of agent computers coupled to a customer center network, identity of domains, network login information.

According to step 1204, the customer center explorer correlates the human resource information, the telephone information and/or the computer information. This may be done by matching the names of agents provided by one external information source to the names of agents provided by another external information source. The name matching enables the customer center explorer to identify a telephone (or telephone extension(s)) and/or computer (or terminal server session) that a particular agent is using.

Figure 13:
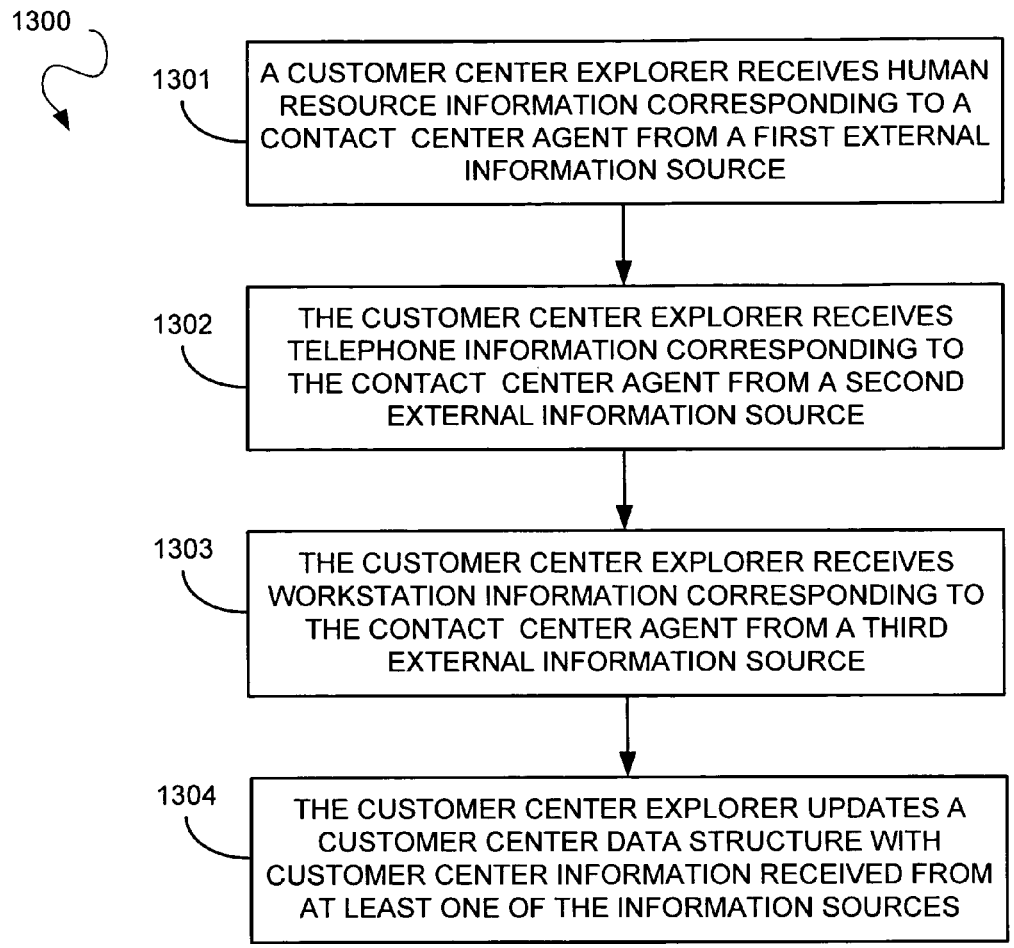

FIG. 13 is a flow chart depicting an embodiment of a customer center discovery method 1300. According to step 1301, a customer center explorer receives human resource information corresponding to customer center agents from a first external information source. The human resource information may include, for example, one or more of the following information corresponding to an agent: name, position in the company, date of birth, social security number, e-mail address, pay rate, name of supervisor and/or home address.

According to step 1302, the customer center explorer receives telephone information corresponding to the customer center agents from a second external information source. The telephone information may include, for example, one or more of the following: telephone extensions on a telephone control device, extension-to-telephone mappings, customer center agent identifications (agent Ds) configured on the telephone control device, agentID-to-agent name mappings According to step 1303, the customer center explorer receives computer information corresponding to customer center agents from a third external information source. The computer information may include, for example, one or more of the following: agentID-to-agent name mappings, identity of agent computers coupled to a customer center network, identity of domains, network login information.

According to step 1304, the customer center explorer creates and/or updates a customer center data structure (e.g., database) with customer center information received from at least one of the external information sources. The data structure enables the customer center to identify a telephone (or telephone extension(s)) and/or computer (or terminal server session) that a particular agent is using.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

Figure 14:
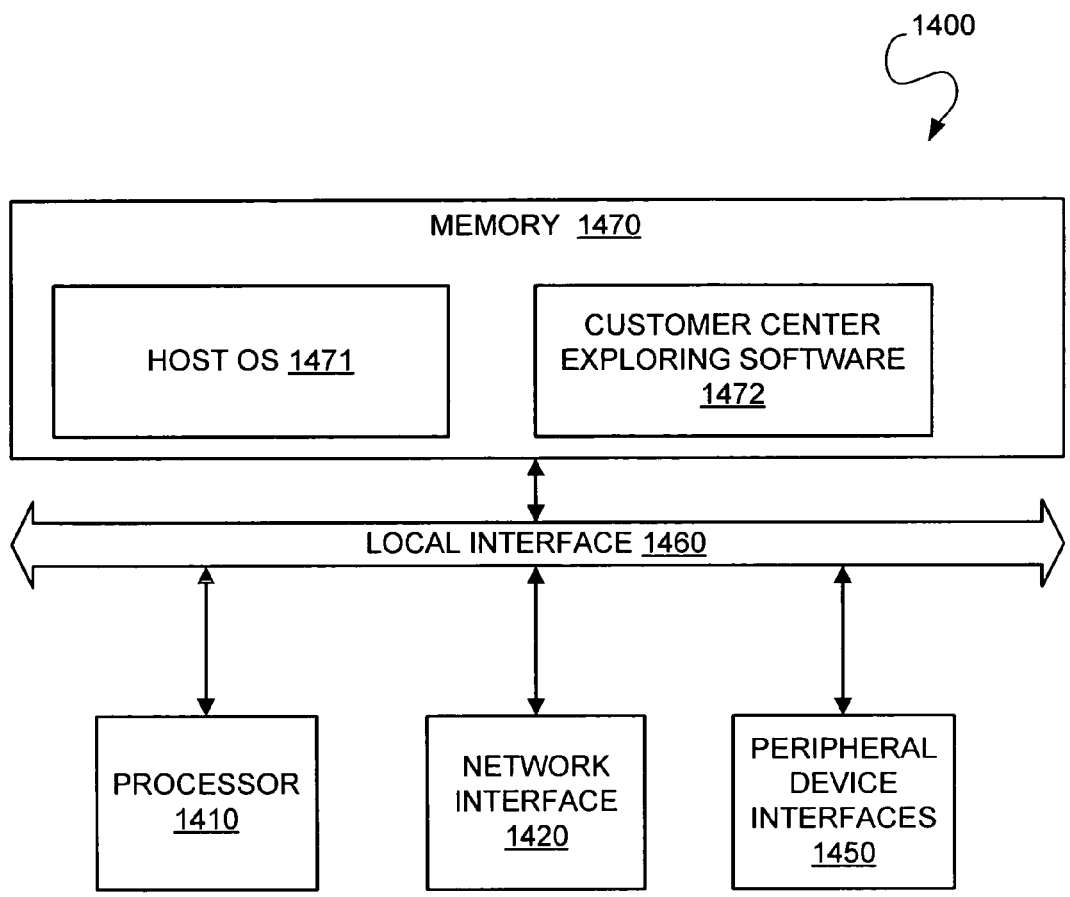
FIG. 14 is a simplified block diagram depicting an embodiment of a customer center explorer configured to operate in a customer center information discovery system.

FIG. 14 is a simplified block diagram of a customer center explorer 1400. Generally, in terms of hardware architecture, as shown in FIG. 14, the components of the customer center explorer 1400 include a processor 1410, a network interface 1420, a memory device 1470, and peripheral device interfaces 1450. These components (810, 1420, 1470, and 1450) may be communicatively coupled via a local interface 1460, which may comprise, for example, one or more buses or other wired or wireless connections. The local interface 1460 may have additional elements, which are omitted for simplicity, such as controllers, buffers (caches), drivers, repeaters, and receivers, to enable communications.

The processor 1410 is a hardware device for executing software, particularly that stored in the memory device 1470. The processor 1410 can be a custom made or commercially available processor, a central processing unit (CPU), an auxiliary processor among several processors associated with the customer center explorer 1400, a semiconductor based microprocessor (in the form of a microchip or chip set), or generally any device for executing software instructions. When the customer center explorer 1400 is in operation, the processor 1410 is configured to execute software stored within the memory device 1470, to communicate data to and from the memory device 1470, and to generally control operations of the customer center explorer 1400 pursuant to the software.

The peripheral device interfaces 1450 may be used to communicate with one or more peripheral devices including, for example, a printer, a copier, a keyboard, a mouse and/or a monitor, etc. The peripheral device interfaces 1450 may include, for example, a serial port, a parallel port, a Small Computer System Interface (SCSI), an infra-red (IR) interface, a radio-frequency (RF) interface and/or a universal serial bus (USB) interface, among others.

The network interface 1420 enables the customer center explorer 1400 to interface with other devices such as, for example, external information sources that provide information corresponding to customer center agents. The network interface 1420 may be, for example, an Ethernet interface.

The memory device 1470 can include any one or combination of volatile and/or non-volatile memory elements now known or later developed. For example, the memory device 1470 may comprise random access memory (RAM), read only memory (ROM), a hard disk, a tape and/or a compact disk ROM (CD-ROM), among others. Note that the memory device 1470 can have a distributed architecture, where various components are situated remote from one another, but can be accessed by the processor 1410. In a preferred embodiment, the memory device 1470 comprises DRAM.

The memory device 1470 includes an operating system (OS) 1471 and customer center exploring software. The OS 1471 essentially controls the execution of other applications, and may provide scheduling, input-output control, file and data management, memory management and/or communication control, among other functionality. The OS 1471 may be for example, a Microsoft™, Macintosh™, or Linux™ based operating system, among others. The customer center exploring software 1472 is configured to receive customer center information from external information sources and to store the customer center information in the customer center explorer 1400.

The customer center exploring software 1472 can be embodied in any computer-readable medium for use by or in connection with an instruction execution system, apparatus, or device, such as a computer-based system or a processor-containing system. In the context of this disclosure, a "computer-readable medium" can be any means that can store, communicate, propagate, or transport a program for use by or in connection with the instruction execution system, apparatus, or device. The computer-readable medium can be, for example, among others, an electronic, magnetic, optical, electromagnetic, infrared, or semiconductor system, apparatus, device, or propagation medium now known or later developed.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed is:

1. A method for discovering customer center information, comprising:
   receiving a plurality of customer center information from a plurality of respective information sources; and
   correlating the plurality of customer center information to determine an identity of a customer center agent accessing customer center resources; and
   updating a data structure according to at least one of the plurality of customer center information.

2. The method of claim 1, wherein the plurality of respective information sources are external information sources.

3. The method of claim 1, further comprising identifying the customer center resources accessed by the customer center agent.

4. The method of claim 1, further comprising requesting the plurality of customer center information from the plurality of respective information sources.

5. The method of claim 1, wherein the plurality of information sources transmit the plurality of customer center information at predetermined time intervals.

6. The method of claim 1, wherein the plurality of information sources transmit the plurality of customer center information responsive to changes in corresponding information stored in the respective information sources.

7. The method of claim 1, wherein the customer center resources comprise at least one of a customer center computer and a customer center telephone.

8. The method of claim 1, wherein the plurality of information sources includes at least one of: a human resources computer, a computer telephony integration (CTI) server, a customer relations management (CRM) server, a telephone control device, a network server, and a customer center agent computer.

9. The method of claim 1, further comprising comparing an agent name received from one information source with an agent name received from another information source.

10. The method of claim 1, further comprising:
    planning at least one campaign to implement goals;
    scheduling and deploying a workforce in accordance with the campaign to produce a plurality of agent-customer interactions;
    measuring performance of the customer center agent on at least a portion of the agent-customer interactions to produce a set of quality metrics for the agent;
    analyzing the quality metrics to produce a rating of the measured interactions;
    combining at least a portion of quality metrics to produce performance indicators; and
    using the performance indicators in the planning step of a second campaign or another iteration of the at least one campaign.

11. A system for discovering customer center information, comprising:
    memory;
    software stored in the memory;
    a processor; and
    at least one communication interface configured to receive a plurality of customer center information from a plurality of respective information sources; and
    wherein the software is configured to instruct the processor to determine whether an identity of a contact center agent included in customer center information received from a first of the plurality of information sources corresponds to an identity of a contact center agent included in customer center information received from a second of the plurality of information sources, and update a data structure according to at least one of the plurality of customer center information.

12. The system of claim 11, wherein the software is configured to instruct the processor to cause the system to send a message responsive to determining that an identity of a contact center agent included in customer center information received from a first of the plurality of information sources does not correspond an identity of a contact center agent included in customer center information received from a second of the plurality of information sources, and wherein the message is configured to inform a recipient of the message that a failure occurred in correlating an identity of a contact center agent.

13. The system of claim 11, wherein contact center agents accesses customer center resources to be included in customer center information, and wherein the customer center resources comprise at least one of a customer center computer, a customer center telephone, a customer center camera, and a customer center microphone.

14. The system of claim 11, wherein the plurality of information sources includes at least one of: a human resources computer, a computer telephony integration (CTI) server, a customer relations management (CRM) server, a telephone control device, a network server, and a customer center agent computer.

15. The system of claim 11, wherein the processor is instructed by the software to initiate messages requesting from the plurality of information sources respective portions of the plurality of customer center information.

16. The system of claim 11, wherein the plurality of information sources transmit the plurality of customer center information at predetermined time intervals.

17. The system of claim 11, wherein the plurality of information sources transmit the plurality of customer center information responsive to changes in corresponding information stored in the respective information sources.

18. The system of claim 11, further comprising:
a workforce manager comprising a scheduler; and
a quality monitor configured to provide, to the scheduler, at least one quality goal for a work period and at least one agent quality score,
wherein the scheduler is configured to produce a workforce schedule comprising agent assignments to work activities, wherein the workforce schedule is based at least in part on the at least one quality goal and the at least one agent quality score.

19. A method for discovering customer center information, comprising:
receiving telephone identification information from a first information source;
receiving computer identification information from a second information source;
receiving information identifying a customer center agent from a third information source;
correlating at least one of the telephone identification information and the computer identification information with the information identifying the customer center agent; and
determining whether at least one of the telephone identification information and the computer identification information corresponds to the customer center agent.

20. The method of claim 19, further comprising sending a message responsive to determining that the at least one of the telephone identification information and the computer identification information does not correspond to the customer center agent, and wherein the message is configured to inform a recipient of the message that a failure occurred in correlating an identity of a contact center agent.

21. The method of claim 19, further comprising updating a data structure according to at least one of the telephone information and the computer identification information.

22. The method of claim 19, wherein the first information source is one of a telephone control device, a customer relations management (CRM) application, and a computer telephony integration (CTI) server.

23. The method of claim 19, further comprising requesting the telephone identification information and the computer identification information from the first and second information sources, respectively.

24. The method of claim 19, wherein the second information source is at least one of a customer center agent computer and a customer center server.

25. The method of claim 19, further comprising identifying a telephone and a computer being used by the customer center agent.

26. The method of claim 19, further comprising:
storing telephone interactions corresponding to the customer center agent; and
storing computer interaction data corresponding to the customer center agent.

27. The method of claim 25, wherein the computer interaction data comprises at least one of computer screen capture data, e-mail data, and web-chat data.

28. The method of claim 19, further comprising:
planning at least one campaign to implement goals;
scheduling and deploying a workforce in accordance with the campaign to produce a plurality of agent-customer interactions;
measuring performance of the customer center agent on at least a portion of the agent-customer interactions to produce a set of quality metrics for the agent;
analyzing the quality metrics to produce a rating of the measured interactions;
combining at least a portion of quality metrics to produce performance indicators; and
using the performance indicators in the planning step of a second campaign or another iteration of the at least one campaign.

* * * * *